United States Patent [19]
Popovich et al.

[11] Patent Number: 6,124,954
[45] Date of Patent: Sep. 26, 2000

[54] PROJECTION SCREEN BASED ON RECONFIGURABLE HOLOGRAPHIC OPTICS FOR IMPLEMENTATION IN HEAD-MOUNTED DISPLAYS

[75] Inventors: Milan M. Popovich, Leicester, United Kingdom; Jonathan D. Waldern, Los Altos Hills, Calif.

[73] Assignee: DigiLens, Inc., Sunnyvale, Calif.

[21] Appl. No.: 09/361,778

[22] Filed: Jul. 26, 1999

Related U.S. Application Data

[60] Provisional application No. 60/094,496, Jul. 29, 1998.

[51] Int. Cl.[7] ........................................ G03H 1/00
[52] U.S. Cl. ........................ 359/13; 359/15; 345/8; 349/11; 349/15; 349/201; 349/202
[58] Field of Search ................... 359/13, 14, 15, 359/24; 345/7, 8, 9; 348/40, 41, 51, 54, 55; 349/5, 8, 10, 11, 13, 15, 201, 202

[56] References Cited

U.S. PATENT DOCUMENTS

| | | | |
|---|---|---|---|
| 4,372,639 | 2/1983 | Johnson . | |
| 5,046,793 | 9/1991 | Hockley et al. | 359/12 |
| 5,129,716 | 7/1992 | Holakovszky et al. | 351/50 |
| 5,191,449 | 3/1993 | Newswanger | 359/22 |
| 5,257,094 | 10/1993 | LaRussa | 359/13 |
| 5,574,473 | 11/1996 | Sekiguchi | 345/8 |
| 5,644,369 | 7/1997 | Jachimowicz et al. | 349/10 |
| 5,698,343 | 12/1997 | Sutherland et al. | 430/1 |
| 5,745,203 | 4/1998 | Valliath et al. | 349/113 |
| 5,751,452 | 5/1998 | Tanaka et al. | 349/13 |
| 5,796,499 | 8/1998 | Wenyon | 359/15 |
| 5,801,793 | 9/1998 | Faris et al. | 349/113 |
| 5,808,802 | 9/1998 | Hur | 359/630 |
| 5,825,448 | 10/1998 | Bos et al. | 349/128 |
| 5,861,995 | 1/1999 | Togino | 359/630 |

FOREIGN PATENT DOCUMENTS

| | | |
|---|---|---|
| WO 97/35223 | 9/1997 | WIPO . |
| WO 98/04650 | 2/1998 | WIPO . |

*Primary Examiner*—Darren E. Schuberg
*Attorney, Agent, or Firm*—Law Offices of Terry McHugh; Thomas H. Ham

[57] ABSTRACT

A head-mounted display system and a method of displaying scenes within the system include two or more reconfigurable holographic optical elements (HOEs) in a holographic diffuser of the system. The reconfigurable HOEs may be configured to perform simple optical functions that are commonly associated with traditional optical devices, such as lenses, prisms and mirrors. However, the reconfigurable HOEs may also be configured to perform sophisticated optical manipulations, such as optimally diffusing light with respect to intensity toward a predefined direction. Each reconfigurable HOE includes a hologram that is sandwiched between two electrode layers. The hologram is a holographic photopolymeric film that has been combined with liquid crystal. The hologram has an optical property that changes in response to an applied electrical field. Stacks of these reconfigurable HOE are utilized to selectively diffuse monochromatic images projected from an image generator to either the right or the left eyepiece optics of the system to present a displayed virtual scene in either a stereoscopic form or a binocular mono form. By utilizing more than one reconfigurable HOE stack for each projected image, the size of effective exit pupils at the eyepiece optics may be increased.

20 Claims, 5 Drawing Sheets

PROJECTION SCREEN BASED ON RECONFIGURABLE HOLOGRAPHIC OPTICS FOR IMPLEMENTATION IN HEAD-MOUNTED DISPLAYS

This application claims the benefit of U.S. Provisional Application No. 60/094,496, filed Jul. 29, 1998.

TECHNICAL FIELD

The invention relates generally to head-mounted display systems and more particularly to a head-mounted display system that utilizes a single image source.

DESCRIPTION OF THE RELATED ART

Head-mounted display systems generally rely on two image sources to visually present right and left images of scenes to the right and left eyes of a user. Typically, the first image source generates an image of a scene that is to be viewed by the right eye of the user, while the second image source generates an image of the scene that is to be viewed by the left eye of the user. A head-mounted display system may be designed to display scenes in a binocular mono form or in a stereoscopic form. In a binocular mono head-mounted display system, the images that are to be viewed by the right and left eyes of the user are the same perspective images of a scene. When these same perspective images are simultaneously viewed, the user observes a binocular mono scene produced by the right and left images. In a stereoscopic head-mounted display system, the images that are to be viewed by the right and left eyes of the user are two slightly different perspective images of the same scene. When these slightly different perspective images are simultaneously viewed, the user observes a stereoscopic scene produced by the right and left perspective images.

In contrast to the head-mounted display systems that utilize two image sources, U.S. Pat. No. 5,808,802 to Hur describes a head-mounted display apparatus that utilizes a single image source. The image source included in the head-mounted display apparatus of Hur is described as an image display device, e.g., a liquid crystal display or cathode ray tube. The apparatus further includes a beam splitter that partially transmits and partially reflects the light from the single image display device, thereby splitting the light into two light beams. In the most simple embodiment, the partially transmitted light is directed to a right lens that is positioned in front of the user's right eye, while the partially reflected light is directed to a mirror that reflects the second light beam to a left lens that is positioned in front of the user's left eye. The right and left lenses enable the user to see enlarged virtual images formed at a certain distance from the user's eyes. The use of the single image source decreases the overall weight of the head-mounted display apparatus. In addition, the amount of circuitry required to transmit video signals from a video source is reduced by the single image source design of the apparatus. Furthermore, the single image source design also eliminates the problems of brightness matching and color balancing that may occur with two image sources.

Although the conventional head-mounted display systems, including the head-mounted display apparatus of Hur, operate well for their intended purposes, what is needed is a light head-mounted display system that provides superior displayed scenes with minimal loss of both brightness and field of view.

SUMMARY OF THE INVENTION

A head-mounted display system and a method of displaying scenes within the system include two or more reconfigurable holographic optical elements (HOEs) in a holographic diffuser. The reconfigurable HOEs may be designed to perform simple optical functions that are commonly associated with traditional optical devices, such as those performed by lenses, prisms and mirrors. However, the reconfigurable HOEs are also designed to perform sophisticated optical manipulations, such as diffusing light with respect to intensity toward a predefined direction. Each reconfigurable HOE includes a hologram that is sandwiched between two electrode layers. The hologram is a holographic photopolymeric film that has been combined with liquid crystal. The presence of the liquid crystal allows the hologram to exhibit optical characteristics that are dependent on an applied electrical field. Preferably, the hologram is a Bragg-type hologram, having a high diffraction efficiency. The electrode layers may be made of Indium Tin Oxide (ITO), which typically has a transmission efficiency of greater than 80%.

The reconfigurable HOE has at least two optical operating states, a diffractive state and a passive state. The diffractive properties of the reconfigurable HOE primarily depend on the recorded holographic fringes in the photopolymeric film. In the diffractive state, the reconfigurable HOE diffracts propagating light in a predefined manner. In the passive state, the reconfigurable HOE does not optically alter the propagating light. Initially, the hologram of the reconfigurable HOE is in the diffractive state, such that received light is diffracted in the predefined manner. However, when an electrical field is generated in the hologram by applying voltage to the electrode layers of the reconfigurable HOE, the operating state of the hologram switches from the diffractive state to the passive state.

In a first embodiment of the present invention, the system includes an image generator, projection optics, a holographic diffuser having two stacks of reconfigurable HOEs, and right and left eyepiece optics. The image generator may be any type of flat panel display device, such as an LCD, a micro-mirror array device or an electroluminescent display device. In a stereoscopic application, the image generator is configured to generate and project right and left perspective images of scenes that will be separately presented to the right and left eyes of the user. In a binocular mono application, the image generator is configured to generate and project same perspective images of the scenes. The first reconfigurable HOE stack of the holographic diffuser is designed to diffuse projected images that are to be viewed by the right eye of a user toward the right eyepiece optics. The second reconfigurable HOE stack is designed to diffuse projected images that are to be viewed by the left eye of the user toward the left eyepiece optics.

The right and left eyepiece optics operate together to form a virtual scene from the projected images from the holographic diffuser. The virtual scene can be viewed by the user of the head-mounted display system through the right and left eyepiece optics. Depending on the right and left images that are projected, the virtual scene may be in a stereoscopic form or in a binocular mono form.

In a modified configuration of the head-mounted display system in accordance with the first embodiment, the holographic diffuser includes additional reconfigurable HOE stacks that operate in conjunction with the two reconfigurable HOE stacks to provide exit pupils at the eyepiece optics that are effectively larger than the exit pupils provided by the two original reconfigurable HOE stacks. In this modified configuration, each reconfigurable HOE stack produces a unique exit pupil at either the right eyepiece optics or the left eyepiece optics. By sequentially diffusing the same image by a number of reconfigurable HOE stacks, the exit pupils associated with these reconfigurable HOE stacks combine to form an effectively larger exit pupil at the right eyepiece optics or the left eyepiece optics. In this manner, the effective exit pupils at both eyepiece optics can be enlarged.

In a second embodiment of the invention, the head-mounted display system further includes a pair of imaging devices. In addition, the holographic diffuser of the system includes more than two reconfigurable HOE stacks. The reconfigurable HOE stacks of the holographic diffuser can be classified into two sets. The reconfigurable HOE stacks of the first set are holographically configured to diffuse the projected images to the right eyepiece optics, while the reconfigurable HOE stacks of the second set are holographically configured to diffuse the projected imaged to the left eyepiece optics. The imaging devices included in this second embodiment may utilize a "charge coupled device" (CCD) or an active pixel sensor (APS) as an imaging sensor to capture images of the eyes of the user. The captured images are then used to determine the relative positions of the pupils of the eyes. Depending on the relative positions of the eye pupils, a pair of reconfigurable HOE stacks included in the holographic diffuser is selectively and sequentially activated to the diffractive state to maximize the field of view perceived by the user. The activated pair includes a reconfigurable HOE stack from the first set of reconfigurable HOE stacks and a reconfigurable HOE stack from a second set of reconfigurable HOE stacks. The maximization of the field of view is achieved by selecting the reconfigurable HOE stacks that create exit pupils at the eyepiece optics that optimally coincide with the pupils of the eyes.

Similar to the head-mounted display system in accordance with the first embodiment, the head-mounted display system in accordance with the second embodiment may be modified to provide effectively larger exit pupils at the right and left eyepiece optics. In this modified configuration, more than one reconfigurable HOE stack are selected to diffuse each projected image toward the right or left eyepiece optics. Depending on the determined positions of the pupils of the eyes, a first subset of reconfigurable HOE stacks from the first set and a second subset of reconfigurable HOE stacks from the second set will be selected to diffuse each pair of right and left images to the right and left eyepiece optics. By sequentially diffusing the same image by the reconfigurable HOE stacks of a given subset, the exit pupils associated with these reconfigurable HOE stacks combine to form an effectively larger exit pupil at the right eyepiece optics or the left eyepiece optics. The effective exit pupils at both eyepiece optics can be enlarged by this technique.

An advantage of the head-mounted display system is that only a single image source, i.e., the image generator, is required to display scenes either in a stereoscopic form or in a binocular mono form. Furthermore, the exit pupils at the eyepiece optics of the system may be selectively displaced to coincide with the pupils of the user's eyes. In addition, the size of effective exit pupils at the eyepiece optics may be increased by utilizing more than one reconfigurable HOE stack to diffuse the projected images to minimize loss of both brightness and field of view perceived by the user.

DETAILED DESCRIPTION

Figure 1:
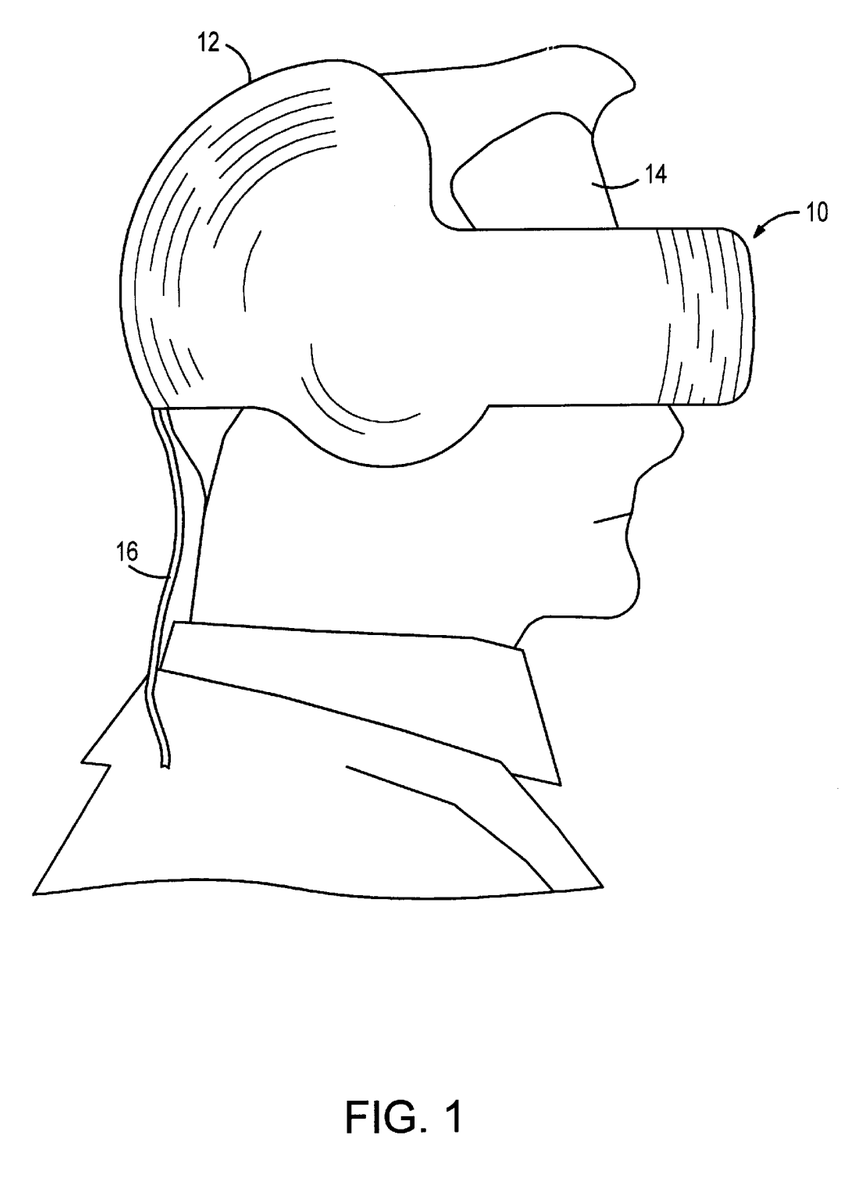
FIG. 1 is a schematic perspective view of a head-mounted display system that includes a holographic diffuser having reconfigurable holographic optical element (HOE) stacks in accordance with a first embodiment of the invention.
Figure 2:
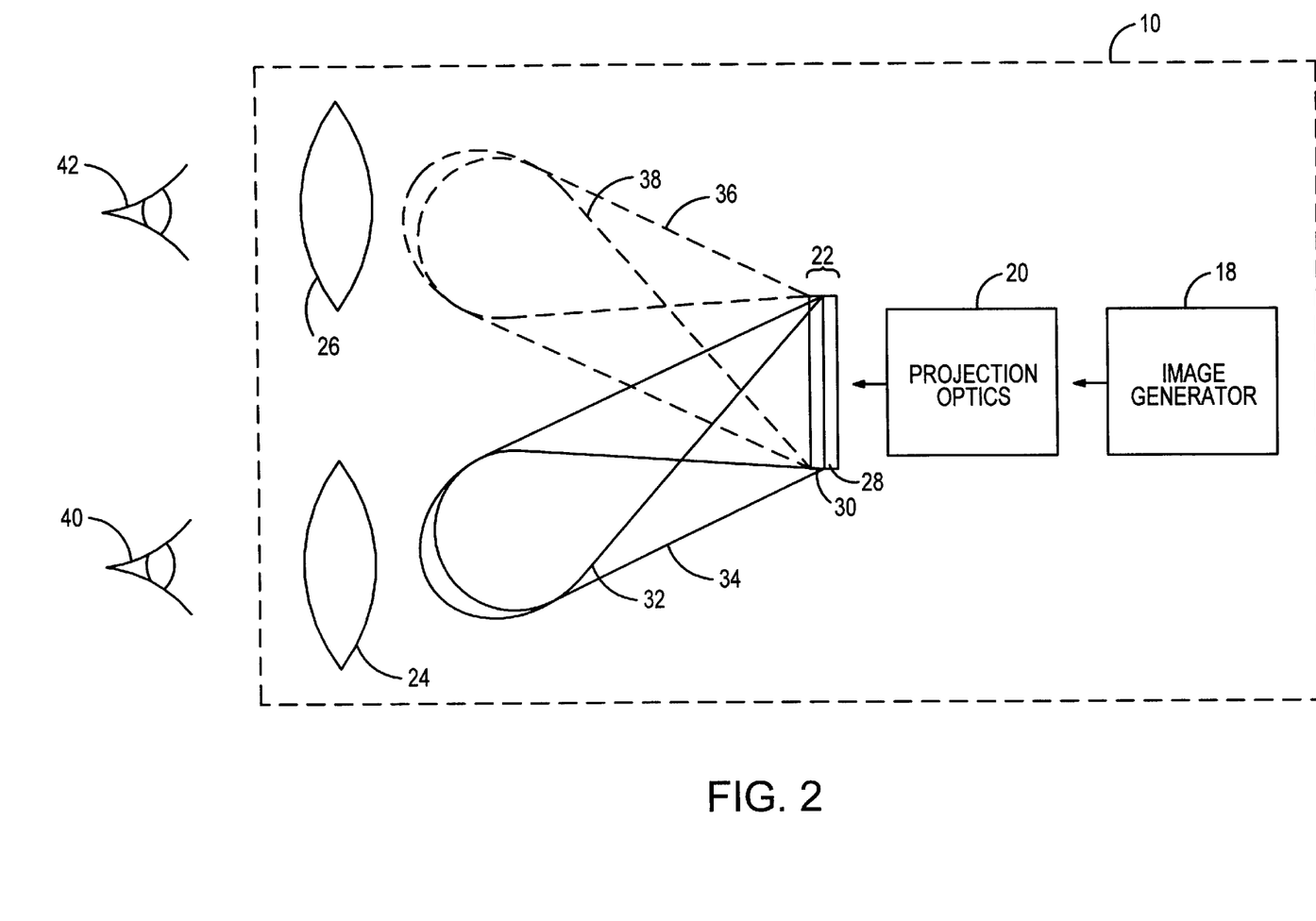
FIG. 2 is a schematic diagram of the image displaying components of the head-mounted display system of FIG. 1.

With reference to FIGS. 1 and 2, a head-mounted display system 10 in accordance with a first embodiment of the invention is shown. The head-mounted display system includes a frame 12 that is designed to be worn by a user 14, as illustrated in FIG. 1. The system may be connected to a video source (not shown) by a cable 16 to receive data that represents scenes that are to be displayed by the system.

The image displaying components of the head-mounted display system 10 include an image generator 18, projection optics 20, a holographic diffuser 22, and eyepiece optics 24 and 26, which are schematically illustrated in FIG. 2. The holographic diffuser includes what will be referred to as "reconfigurable holographic optical elements" (HOEs). Similar to conventional HOEs, these reconfigurable HOEs can perform functions typically associated with traditional optical elements, as well as more sophisticated optical manipulations. However, the reconfigurable HOEs can alter their optical properties when an electrical field is applied.

The reconfigurable HOE includes a hologram that is sandwiched between two electrode layers. The hologram is preferably a Bragg-type hologram, having a high diffraction efficiency. The hologram is a holographic photopolymeric film that has been combined with liquid crystal. As an example, the photopolymeric film may be composed of a polymerizable monomer having dipentaerythritol hydroxypentacrylate, as described in PCT Application No. PCT/US97/12577 by Sutherland et al. The liquid crystal may be suffused into the pores of the photopolymeric film. The holographic fringes may be recorded into the photopolymeric film either prior to or after being combined with the liquid crystal. In the preferred embodiment, the photopolymeric material is combined with the liquid crystal prior to a recording. In this preferred embodiment, the liquid crystal and the polymer material are pre-mixed and the phase separation takes place during the recording of the hologram, such that the holographic fringes become populated with a high concentration of liquid crystal droplets. This process can be regarded as a "dry" process, which is advantageous in terms of mass production of the reconfigurable HOEs.

Recording of the hologram can be accomplished by a traditional optical process in which interference fringes are created by applying beams of light. Alternatively, the interference fringes may be artificially created by using highly accurate laser writing devices or other optical replication techniques. The electrode layers that are adjacent to the hologram are made of a transparent conductive material. As an example, the electrode layers may be made of Indium Tin Oxide (ITO), which usually has a transmission efficiency of greater than 80%. An electrical field is generated within the hologram when a potential difference is applied to the layers.

The reconfigurable HOE has at least two optically operating states, a diffractive state and a passive state. The optical properties of the reconfigurable HOE primarily depend on the recorded holographic fringes in the photopolymeric film. In the diffractive state, the reconfigurable HOE diffracts propagating light in a predefined manner. In the passive state, the reconfigurable HOE does not optically alter the propagating light. Initially, the hologram of the reconfigurable HOE is in the diffractive state, such that received light is diffracted in the predefined manner. However, when an electrical field is created in the hologram by applying voltage to the electrode layers of the reconfigurable HOE, the optical state of the hologram switches from the diffractive state to the passive state.

The holographic diffuser 22 includes two reconfigurable HOE stacks 28 and 30. Each stack contains three reconfigurable HOEs. The reconfigurable HOE stack 28 is designed to diffuse a right image of a scene projected from the image generator 18, such that the right image is directed toward the right eyepiece optics 24, as illustrated by polar diagrams 32 and 34. However, the reconfigurable HOE stack 30 is designed to diffuse a left image of the same scene projected from the image generator, such that the left image is directed toward the left eyepiece optics 26, as illustrated by polar diagrams 36 and 38. The reconfigurable HOE stacks operate in an alternating fashion to direct the right and left images to the corresponding right and left eyepiece optics. The right eyepiece optics 24 operates to form a virtual image of the right image generated by the image generator, thereby allowing the right eye 40 of the user to view the right image. Similarly, the left eyepiece optics 26 operates to form a virtual image of the left image that is viewed by the left eye 42 of the user. The two virtual images form a displayed scene that can be observed by the user of the head-mounted display system 10.

Figure 3:
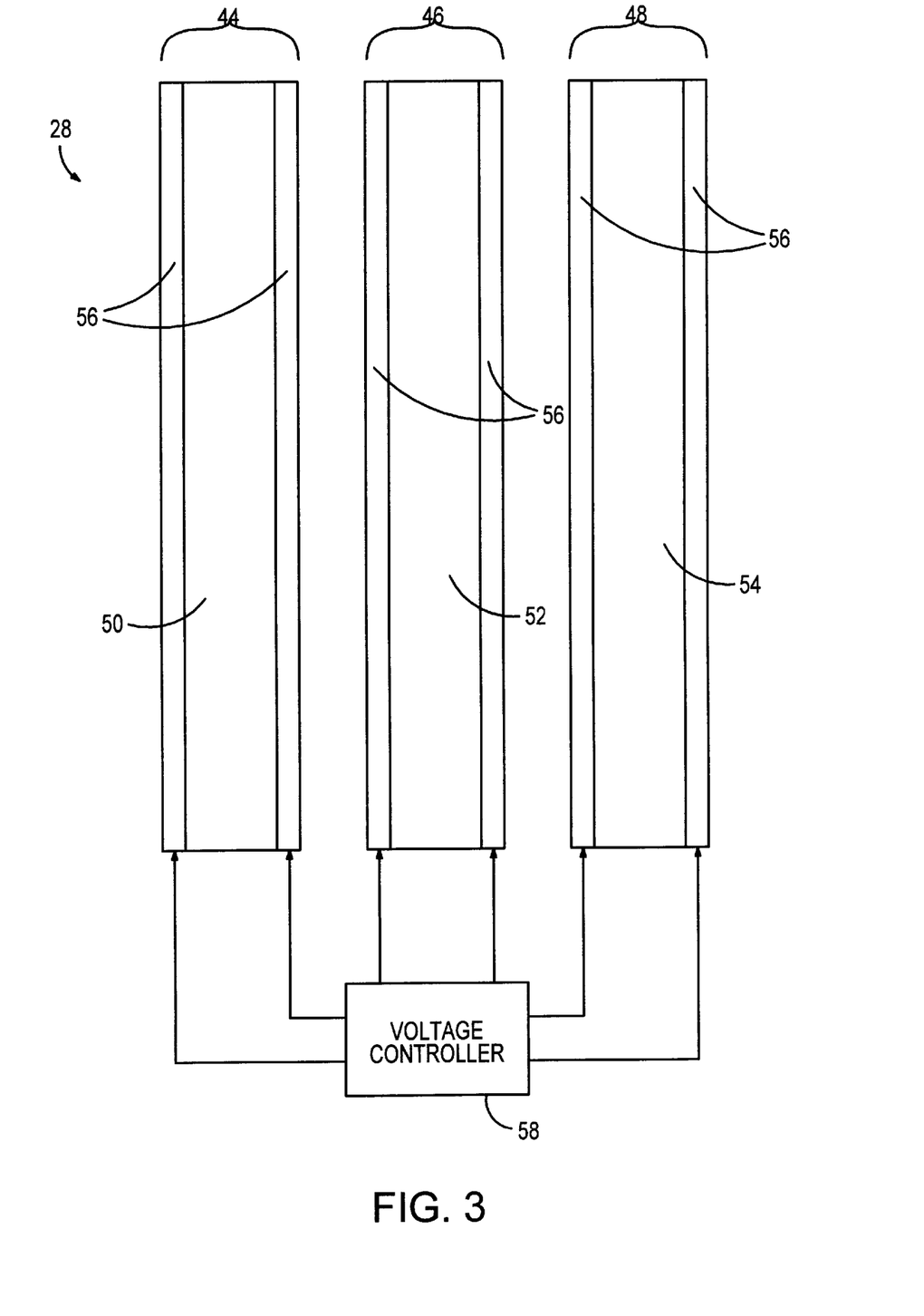
FIG. 3 is a schematic diagram of the components of a reconfigurable HOE stack in accordance with the invention.

Structurally, the stacks 28 and 30 are essentially identical, except for the interference fringes recorded in the reconfigurable HOEs of the stacks. Therefore, only the stack 28 will be described in detail. In FIG. 3, the components of the reconfigurable HOE stack 28 are shown. The stack 28 includes three reconfigurable HOEs 44, 46 and 48. The reconfigurable HOE 44 includes a hologram 50 that is sandwiched between two electrodes 56. Similarly, the reconfigurable HOE 46 includes a hologram 52 between a pair of electrodes 56, and the reconfigurable HOE 48 includes a hologram 54 between another pair of electrodes 56. Each hologram 50, 52 and 54 is holographically configured to have a diffusing characteristic that results in the diffusion pattern, as illustrated by the polar diagrams 32 and 34 of FIG. 2. However, each hologram is also configured such that only a particular monochromatic light is diffused by the hologram. The hologram 50 is dedicated to operate on red light. The hologram 52 is configured to only operate on green light, while the hologram 54 is specific to blue light. The electrodes of the reconfigurable HOEs are individually coupled to a voltage controller 58. The voltage controller selectively provides an excitation signal to the electrodes of a selected reconfigurable HOE, switching the hologram of that reconfigurable HOE from the diffractive state to the passive state. The hologram in the passive state can then be switched to the diffractive state by removing the voltage to the electrodes.

Although not illustrated, the stack 30 also includes three reconfigurable HOEs that are each configured to diffuse a particular monochromatic light. The reconfigurable HOEs of the stack 30 may be coupled to the voltage controller 58, along with the reconfigurable HOEs of the stack 28. In an alternative arrangement, the reconfigurable HOEs of stack 30 may be coupled to a separate voltage controller. The only significant difference between the stacks 28 and 30 is that the reconfigurable HOEs of the stack 28 are holographically configured to produce a first diffusion pattern, as illustrated by the polar diagrams 32 and 34, while the reconfigurable HOEs of the stack 30 are configured to produce a second diffusion pattern, as illustrated by the polar diagrams 36 and 38.

In order to display a color scene, the head-mounted system 10 operates to sequentially display three right monochromatic images of the scene and three left monochromatic images of the same scene, with each monochromatic image corresponding to one of the tristimulus colors, i.e., red, green and blue. The monochromatic images are sequentially generated and projected to the holographic diffuser 22 by the image generator 18. The image generator may be any type of flat panel display device. The image generator may be a transmissive display device, e.g., an LCD with backlight. The image generator may also be a white light illuminated reflective display device, e.g., an LCD or micro-mirror array device. Alternatively, the image generator may be an emissive display device, such as an electroluminescent display device.

The generated monochromatic images are projected to the holographic diffuser 22 through the projection optics 20. The projection optics may focus and magnify the projected monochromatic images, so that the images can be properly diffused to the right and left eyepiece optics 24 and 26.

The holographic diffuser 22 operates in conjunction with the image generator 18 to selectively diffuse the projected monochromatic images in one of the two diffusion patterns, so that the right images are directed to the right eyepiece optics 24 and the left images are directed to the left eyepiece optics 26. When a color set of right images is generated and projected, the reconfigurable HOE stack 28 is selected to optically operate on these projected images. The unselected reconfigurable HOE stack 30 is set be optically passive to the projected images. Similarly, when the color set of left images is generated and projected, the reconfigurable HOE stack 30 is selected to optically operate on these projected images and the reconfigurable HOE stack 28 is set to be optically passive.

When the right images of a scene are being sequentially generated and projected by the image generator 18, the reconfigurable HOEs 44, 46 and 48 of the stack 28 sequentially diffuse these projected images to the right eyepiece optics 24. In a cycle synchronized with the refresh rate of the image generator, the reconfigurable HOEs 44, 46 and 48 of stack 28 are selectively and individually set to the diffractive state by the voltage controller 58. During a period when the image generator projects a red monochromatic image, the reconfigurable HOE 44 is set to the diffractive state to diffuse the image in the first diffusion pattern, as illustrated by the polar diagrams 32 and 34. The other reconfigurable HOEs 46 and 48 are set to the passive state. During a period when the image generator projects a green monochromatic image, the reconfigurable HOE 46 is set to the diffractive state to diffuse the green image in the first diffusion pattern, while the reconfigurable HOEs 44 and 48 are set to the passive state. Similarly, during a period when the image generator projects a blue monochromatic image, the reconfigurable HOE 48 is set to the diffractive state to diffuse the blue image in the first diffusion pattern, while the reconfigurable HOEs 44 and 46 are set to the passive state. The order in which the monochromatic images are projected and diffused is not critical to the invention. With a sufficient refresh rate, the sequential diffusion of the right monochromatic images to the right eyepiece optics 24 allows the right eyepiece optics to form a composite color virtual image from the right monochromatic images.

In a similar manner, the left monochromatic images of the same scene are sequentially diffused by the reconfigurable HOE stack 30 to the left eyepiece optics 26. The sequential diffusion of the left perspective images allows the left eyepiece optics to form a composite color virtual image from the left monochromatic images. Although the right and left color virtual images are formed consecutively, these virtual images will appear to be simultaneously present, if the left and right scenes are projected to the right and left eyepiece optics with sufficient speed. This is a direct result of binocular fusion, in which the left and right eye images are fused during an eye integration time. When the left and right color virtual images are viewed "simultaneously," the user 14 will view a single scene formed by the two color virtual images.

The head-mounted display system 10 may be modified to provide exit pupils at the eyepiece optics 24 and 26 that are effectively larger than the exit pupils provided by the reconfigurable HOE stacks 28 and 30. In this modified configuration, the holographic diffuser 22 includes additional reconfigurable HOE stacks that operate in conjunction with the reconfigurable HOE stacks 28 and 30. The number of additional reconfigurable HOE stacks included in the holographic diffuser is not critical. As an example, the holographic diffuser may have a first set of four reconfigurable HOE stacks, including the reconfigurable HOE stack 28, and a second set of four reconfigurable HOE stacks, including the reconfigurable HOE stack 30. The reconfigurable HOE stacks of the first set are holographically configured to diffuse images to the right eyepiece optics 24, while the reconfigurable HOE stacks of the second set are holographically configured to diffuse images to the left eyepiece optics 26. Each reconfigurable HOE stack of the first and second sets produces a unique exit pupil at either the right eyepiece optics or the left eyepiece optics. By sequentially diffusing the same image by the reconfigurable HOE stacks of a given set, the exit pupils associated with these reconfigurable HOE stacks combine to form an effectively larger exit pupil at the right eyepiece optics or the left eyepiece optics. In this manner, the effective exit pupils at both eyepiece optics can be enlarged.

Figure 4:
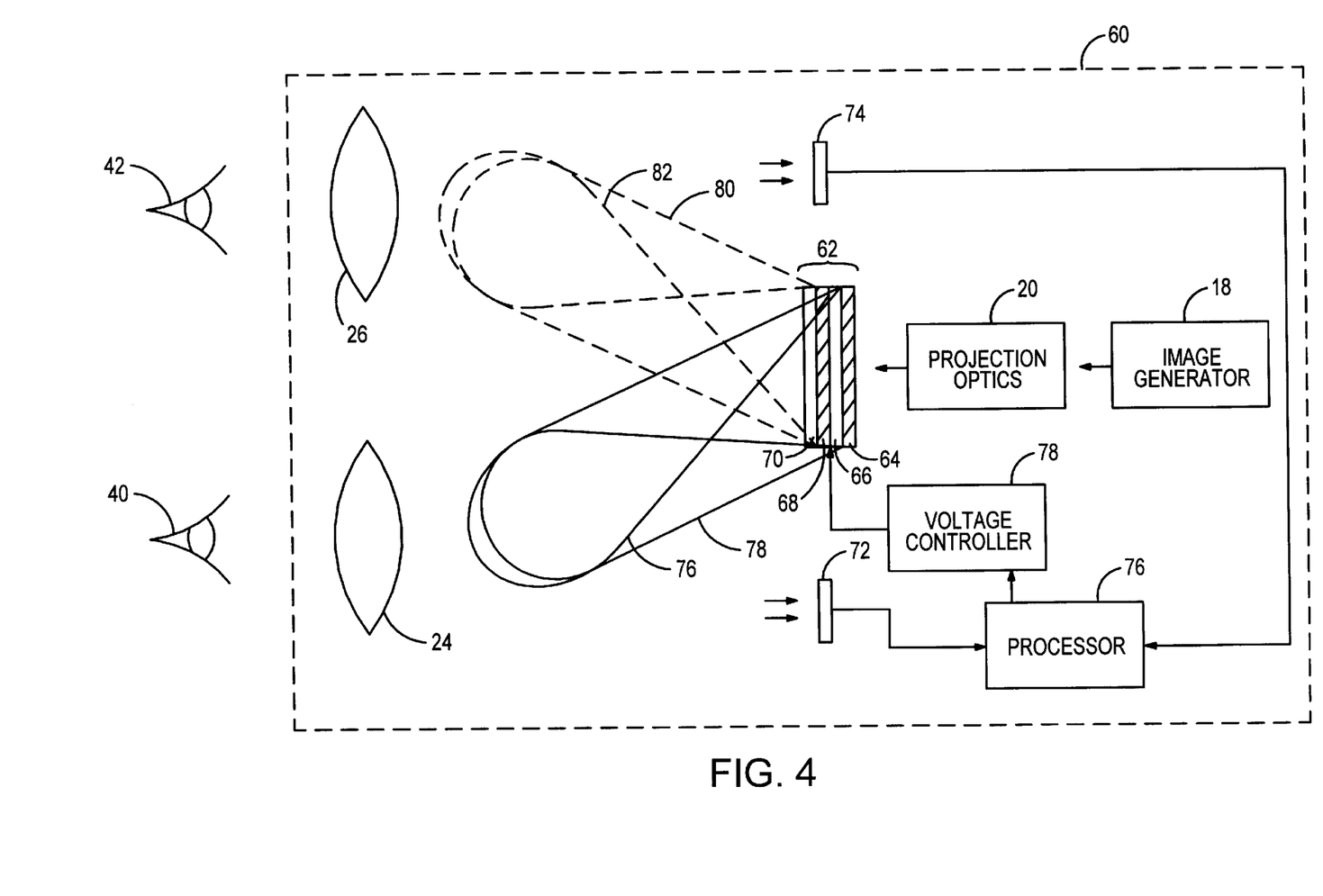
FIG. 4 is a schematic diagram of a head-mounted display system in accordance with a second embodiment of the invention.

Turning to FIG. 4, image displaying components of a headmounted display system 60 in accordance with a second embodiment are shown. The same reference numerals of FIG. 2 will be used for the same components illustrated in FIG. 4. The system 60 includes the image generator 18, the projection optics 20, a holographic diffuser 62, and the right and left eyepiece optics 24 and 26. The holographic diffuser contains more than one reconfigurable HOE stack that are configured to diffuse projected images either to the right eyepiece optics 24 or to the left eyepiece optics 26. Although the holographic diffuser may include a large number of reconfigurable HOE stacks, the holographic diffuser is illustrated in FIG. 4 as having only four reconfigurable HOE stacks 64, 66, 68 and 70. The reconfigurable HOE stacks 64 and 66 are configured to diffuse the projected images toward the right eyepiece optics, while the reconfigurable HOE stacks 68 and 70 are configured to diffuse the projected images toward the left eyepiece optics. Similar to the stacks 28 and 30 of the holographic diffuser 22 in FIG. 1, each of the stacks 64–70 is composed of three reconfigurable HOEs that are holographically configured to be wavelength selective to diffuse monochromatic images of a particular tristimulus color projected from the image generator 18.

The head-mounted display system 60 further includes two imaging devices 72 and 74, a processor 76 and a voltage controller 78. The imaging devices may utilize a "charge coupled device" (CCD) or an active pixel sensor (APS) as an imaging sensor to capture images of the eyes 40 and 42. The imaging device 72 operates to capture an image of the right eye 40, while the imaging device 74 operates to capture an image of the left eye 42. The captured images are transmitted to the processor 76 for processing. The processor is configured to analyze the images of the eyes to determine the relative positions of the eye pupils. Depending on the relative positions of the eye pupils, the processor directs the voltage controller 78 to selectively activate a pair of reconfigurable HOE stacks 64–70 to the diffractive state to maximize the field of view perceived by the user 14. The activated pair includes a first reconfigurable HOE stack from the reconfigurable HOE stacks 64 and 66 and a second reconfigurable HOE stack from the reconfigurable HOE stacks 68 and 70. The maximization of the field of view is achieved by selecting the reconfigurable HOE stacks that create exit pupils at the eyepiece optics that optimally coincide with the pupils of the eyes. As an example, if the relative positions of the eye pupils optimally coincide with the exit pupils that would be produced by the reconfigurable HOE stacks 64 and 68, the reconfigurable HOE stack 64 will be selected to diffuse projected right images to the right eyepiece optics 24, as illustrated by polar diagrams 76 and 78, and the reconfigurable HOE stack 68 will be selected to diffuse projected left images to the left eyepiece optics 26, as illustrated by polar diagrams 80 and 82.

After the pair of reconfigurable HOE stacks is selected, the selected pair of reconfigurable HOE stacks operates in the same manner as the reconfigurable HOE stacks 28 and 30 of the holographic diffuser 22 in FIG. 2 to sequentially direct corresponding projected images to the right and left eyepiece optics 24 and 26. However, the selected pair of reconfigurable HOE stacks may change as the pupils of the eyes 40 and 42 change their relative positions. As an example, the processor 76 may initially direct the voltage controller 78 to activate the reconfigurable HOE stacks 64 and 68 to the diffractive state in response to the images of the eyes captured by the imaging devices 72 and 74. However, as the relative positions of the eye pupils change, the process 76 may direct the voltage controller 78 to activate the reconfigurable HOE stacks 66 and 70 to the diffractive state in response to the new images of the eyes captured by the imaging devices.

Similar to the head-mounted display system 10, the head-mounted display system 60 may be modified to provide effectively larger exit pupils at the right and left eyepiece optics 24 and 26. In this modified configuration, the holographic diffuser 62 includes a number of reconfigurable HOE stacks in addition to the reconfigurable HOE stacks 64–70. Depending on the determined positions of the pupils of the eyes 40 and 42, first and second sets of two or more reconfigurable HOE stacks will be selected to diffuse right and left images to the right and left eyepiece optics. By sequentially diffusing the same image by the reconfigurable HOE stacks of a given set, the exit pupils associated with these reconfigurable HOE stacks combine to form an effectively larger exit pupil at the right eyepiece optics or the left eyepiece optics. The effective exit pupils at both eyepiece optics can be enlarged by this technique.

For both embodiments, the head-mounted display systems 10 and 60 may be configured to display the projected images either in a stereoscopic form or a binocular mono form. In a stereoscopic display, the image generator 18 is configured to generate and to project two slightly different perspective images of an input scene. The right perspective image is then diffused to the right eyepiece optics 24, while the left perspective image is diffused to the left eyepiece optics 26. The right and left eyepiece optics form right and left perspective virtual images from these right and left perspective images. When the different perspective virtual images are viewed by the user of the system, the user will observe a composite virtual scene of the input scene in a stereoscopic form. In a binocular mono display, the image generator 18 is configured to generate and to project same perspective images of the input scene. When virtual images of these same perspective images are viewed, the user of the head-mounted system will observe the composite virtual image of the input scene in a binocular mono form.

Figure 5:
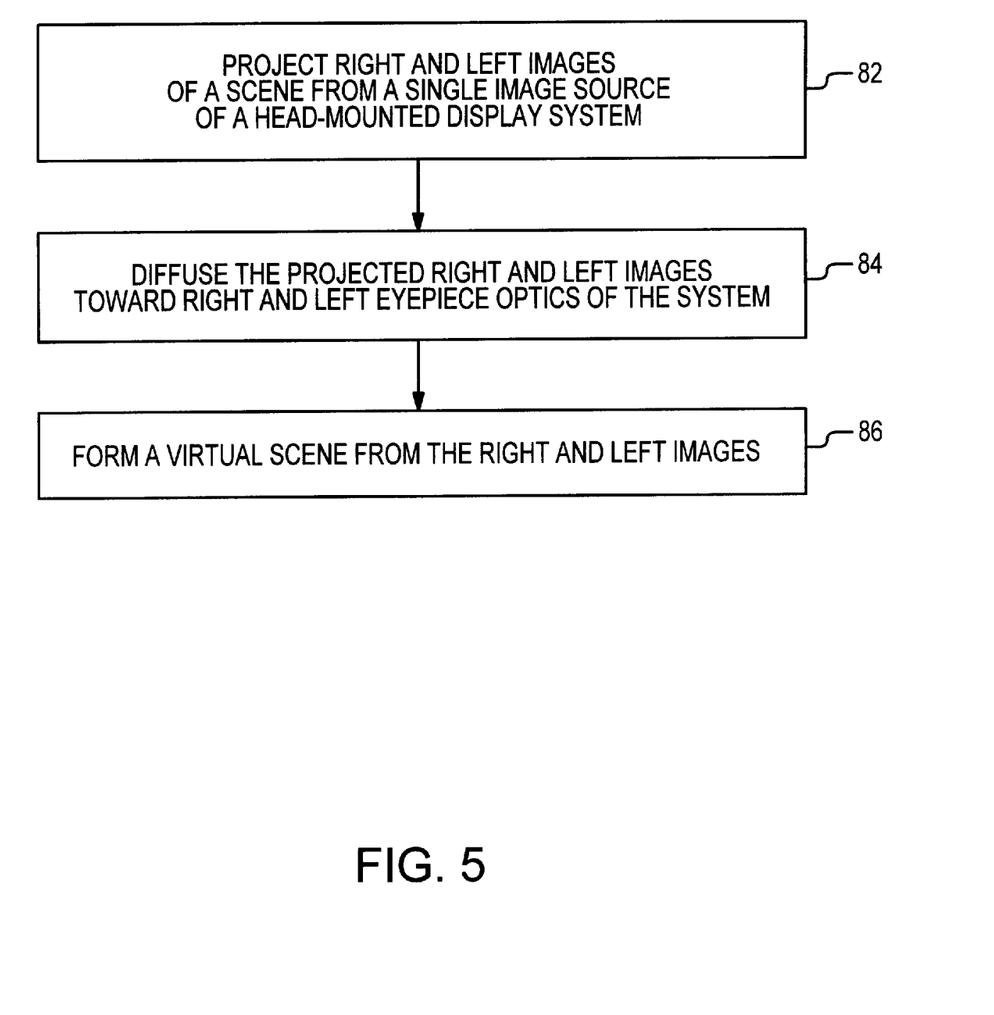
FIG. 5 is a flow diagram of a method of displaying a scene using a head-mounted display system in accordance with the invention.

A method of displaying scenes within a head-mounted display system in accordance with the invention will be described with reference to FIG. 5. At step 82, right and left images of a scene are sequentially projected from a single image source. In one embodiment, the right and left images may be two slightly different perspective images of a common scene for stereoscopic display. In another embodiment, the right and left images may be the same image of a scene for binocular mono display. At step 84, the right and left images are selectively and sequentially diffused by reconfigurable HOEs of a holographic diffuser toward right and left eyepiece optics. The selective and sequential diffusion of the right and left images is achieved by temporally activating two reconfigurable HOEs of the holographic diffuser to a diffractive state in synchronization with the sequential projection of the right and left images. When the right image is projected, the reconfigurable HOE that has a diffusing characteristic to diffuse the right image to the right eyepiece optics is activated to the diffractive state. Similarly, when the left image is projected, the reconfigurable HOE that has a diffusing characteristic to diffuse the left image to the left eyepiece optics is activated. Next, at step 86, a virtual scene is formed from said right and left images, which can be observed through the right and left eyepiece optics. If the right and left images are two different perspective images of a scene, the virtual scene will appear in a stereoscopic form. However, if the right and left images are same perspective images of the scene, the virtual scene will appear in a binocular mono form.

What is claimed is:

1. A head-mounted display system comprising:

a frame designed to be placed on a head of a viewer;

image-generating means attached to said frame for projecting right and left images of a scene in a predetermined direction;

light-manipulating means attached to said frame and optically aligned with respect to said image-generating means for selectively diffusing said right and left images toward right and left eyes of said viewer, said light-manipulating means including first and second reconfigurable holographic optical elements, each of said first and second reconfigurable holographic optical elements having a diffusing characteristic that is responsive to an applied electrical field, said first reconfigurable holographic optical element being configured to diffuse said right image toward said right eye of said viewer when in a diffractive state, said second reconfigurable holographic optical element being configured to diffuse said left image to said left eye of said viewer when in said diffractive state; and viewing means attached to said frame and operatively coupled to said light-manipulating means for visually presenting said right and left images of said scene to said eyes of said viewer.

2. The system of claim 1 wherein said first and second reconfigurable holographic optical elements of said light-manipulating means are holographically configured to optically manipulate monochromatic light such that said right and left images of said scene are monochromatically diffused to said viewing means.

3. The system of claim 2 wherein said first reconfigurable holographic optical element of said light-manipulating means is one member of a first set of three reconfigurable holographic optical elements and wherein said second reconfigurable holographic optical element of said light-manipulating means is one member of a second set of three reconfigurable holographic optical elements, each of said reconfigurable holographic optical elements being holographically configured to optically manipulate one of tristimulus color lights when in said diffractive state to form a color scene that can be observed through said viewing means.

4. The system of claim 1 wherein said first reconfigurable holographic optical element of said light-manipulating means is configured to create a first exit pupil at said viewing means when in said diffractive state, and wherein said second reconfigurable holographic optical element of said light-manipulating means is configured to create a second exit pupil at said viewing means when in said diffractive state.

5. The system of claim 4 wherein said light-manipulating means further includes third and fourth reconfigurable holographic optical elements, said third reconfigurable holographic optical element having a diffusing characteristic to diffuse said left image to said viewing means such that a third exit pupil at said viewing means is created when said third reconfigurable holographic optical element is in said diffractive state, said fourth reconfigurable holographic optical element having a diffusing characteristic to diffuse said right image to said viewing means such that a fourth exit pupil at said viewing means is created when said fourth reconfigurable holographic optical element is in said diffractive state.

6. The system of claim 5 further comprising a voltage controller electrically coupled to said first, said second, said third and said fourth reconfigurable holographic optical elements of said light-manipulating means to selectively provide voltage to said reconfigurable holographic optical elements in order to sequentially activate said reconfigurable holographic optical elements to said diffractive state, said sequential activation of said reconfigurable holographic optical elements creating a first composite exit pupil and a second composite exit pupil at said viewing means, said first composite exit pupil being formed by said first and third exit pupils, said second composite exit pupil being formed by said second and fourth exit pupils.

7. The system of claim 5 further comprising a detecting means for determining relative positions of eye pupils of said viewer, said detecting means being operatively associated with said light-manipulating means such that selected reconfigurable holographic optical elements of said light-manipulating means are activated to said diffractive state in response to a determination of said relative positions of said eye pupils.

8. The system of claim 7 wherein said detecting means includes an imaging sensor that captures an image of a selected eye of said viewer to determine said relative position of an eye pupil of said selected eye.

9. The system of claim 1 wherein said image-generating means is configured to project right and left perspective images of said scene, said right and left perspective images forming a stereoscopic view of said scene when said right and left perspective images are viewed through said viewing means.

10. A method of displaying scenes within a head-mounted display system comprising steps of:
projecting right and left images of a scene from a single image source of said head-mounted display system;
selectively diffusing said right and left images to right and left eyepiece optics of said head-mounted display system, including transmitting said right and left images through first and second reconfigurable holographic optical elements of said head-mounted display system, each of said first and second reconfigurable holographic optical elements having a diffusing characteristic that is controllable by an applied electrical field, said first reconfigurable holographic optical element being configured to diffuse said right image to said right eyepiece optics when in a diffractive state such that a first exit pupil is defined at said right eyepiece optics, said second reconfigurable holographic optical element being configured to diffuse said left image to said left eyepiece optics when in said diffractive state such that a second exit pupil is defined at said right eyepiece optics; and
forming a virtual scene from said right and left images of said scene that can be observed through said right and left eyepiece optics.

11. The method of claim 10 further comprising a step of increasing effective sizes of said first and second exit pupils at said right and left eyepiece optics by transmitting said right and left images of said scene through third and fourth reconfigurable holographic optical elements of said head-mounted display system, said third reconfigurable holographic optical element having a diffusing characteristic to effectuate a third exit pupil at said right eyepiece optics that increases said effective size of said first exit pupil by operatively combining with said first exit pupil, said fourth reconfigurable holographic optical element having a diffusing characteristic to effectuate a fourth exit pupil at said right eyepiece optics that increases said effective size of said second exit pupil by operatively combining with said second exit pupil.

12. The method of claim 10 further comprising a step of changing said first and second exit pupils at said right and left eyepiece optics into third and fourth exit pupils by transmitting said right and left images of said scene through third and fourth reconfigurable holographic optical elements of said head-mounted display system, said third reconfigurable holographic optical element being configured to diffuse said right image to said right eyepiece optics when in said diffractive state such that said third exit pupil is defined at said right eyepiece optics, said fourth reconfigurable holographic optical element being configured to diffuse said left image to said left eyepiece optics when in said diffractive state such that said fourth exit pupil is defined at said right eyepiece optics.

13. The method of claim 10 further comprising step of:
determining relative positions of eye pupils of a user of said head-mounted display system; and
selectively enabling two reconfigurable holographic optical elements from a plurality of reconfigurable holographic optical elements to said diffractive state in response to said determination of said relative positions of said observer, said plurality including said first and second reconfigurable holographic optical elements, said two reconfigurable holographic optical elements being selected based on an optical alignment of corresponding exit pupils at said right and left eyepiece optics with said eye pupils of said user, said corresponding exit pupils being operatively associated with said two reconfigurable holographic optical elements.

14. The method of claim 13 wherein said step of determining said relative positions of said eye pupils of said user includes imaging said eye pupils of said user to calculate said relative position of said eye pupils.

15. The method of claim 13 further comprising a step of increasing effective sizes of said corresponding exit pupils at said right and left eyepiece optics by transmitting said right and left images of said scene through third and fourth reconfigurable holographic optical elements of said plurality, said third reconfigurable holographic optical element having a diffusing characteristic to effectuate a third exit pupil at said right eyepiece optics that increases said effective size of said corresponding exit pupil at said right eyepiece optics by operatively combining with said corresponding exit pupil at said right eyepiece optics, said fourth reconfigurable holographic optical element having a diffusing characteristic to effectuate a fourth exit pupil at said right eyepiece optics that increases said effective size of said corresponding exit pupil at said left eyepiece optics by combining with said corresponding exit pupil at said left eyepiece optics.

16. A head-mounted display system comprising:
a frame designed to be placed on a head of a viewer;
an image generator affixed to said frame, said image generator being configured to project right and left images of a scene;
a holographic diffuser affixed to said frame and optically aligned with respect to said image generator to receive said right and left images, said holographic diffuser including first and second reconfigurable holographic optical elements, each of said first and second reconfigurable holographic optical elements having a diffusing characteristic that is responsive to an applied electrical field, said first reconfigurable holographic optical element being configured to diffuse said right image toward a right eye of said viewer when in a diffractive state, said second reconfigurable holographic optical element being configured to diffuse said left image to said left eye of said viewer when in said diffractive state; and
right and left eyepiece optics affixed to said frame and operatively coupled to said holographic diffuser, said right and left eyepiece optics being optically configured to form a virtual scene from said right and left images of said scene that can be observed by said viewer through said right and left eyepiece optics.

17. The system of claim 16 wherein said holographic diffuser includes first and second pluralities of reconfigurable holographic optical elements, each reconfigurable holographic optical element of said first plurality being holographically configured to diffuse a projected image toward said right eyepiece optics such that a distinct right exit pupil is formed at said right eyepiece optics, each reconfigurable holographic optical element of said second plurality being holographically configured to diffuse said projected image toward said left eyepiece optics such that a distinct left exit pupil is formed at said left eyepiece optics, said first reconfigurable holographic optical element being a member of said first plurality, said second reconfigurable holographic optical element being a member of said second plurality.

18. The system of claim 17 further comprising a detecting means operatively coupled to said holographic diffuser for determining relative positions of eye pupils of said viewer, said detecting means being operatively connected to said reconfigurable holographic optical elements of said holographic diffuser to selectively activate at least one reconfigurable holographic optical element in response to said determination of said relative positions of said eye pupils.

19. The system of claim 18 further comprising a supplying means for providing voltage to at least two selected reconfigurable holographic optical elements from said first and second pluralities of reconfigurable holographic optical elements to generate said applied electrical field, said supplying means being operatively associated with said detecting means to provide said voltage to said selected reconfigurable holographic optical elements in response to said determination of said relative positions of said eye pupils.

20. The system of claim 17 further comprising a processor operatively connected to said holographic diffuser, said processor being configured to sequentially activate first selected reconfigurable holographic optical elements of said first plurality and second selected reconfigurable holographic optical elements of said second plurality to said diffractive state, said selective activation of said first selected reconfigurable holographic optical elements of said first plurality providing a first combined exit pupil at said right eyepiece optics, said first combined exit pupil being a product of exit pupils associated with said first selected reconfigurable holographic optical elements of said first plurality, said selective activation of said second selected reconfigurable holographic optical elements of said second plurality providing a second combined exit pupil at said left eyepiece optics, said second combined exit pupil being a product of exit pupils associated with said second selected reconfigurable holographic optical elements of said second plurality.

* * * * *